United States Patent [19]

Hirata et al.

[11] Patent Number: 4,818,575
[45] Date of Patent: Apr. 4, 1989

[54] BIAXIALLY DRAWN POLYESTER VESSEL HAVING RESISTANCE TO HEAT DISTORTION AND GAS BARRIER PROPERTIES AND PROCESS FOR PREPARATION THEREOF

[75] Inventors: Shunsaku Hirata; Shigezo Nohara, both of Yokohama; Sadao Hirata, Kamakura, all of Japan

[73] Assignee: Toyo Seikan Kaisha, Ltd., Tokyo, Japan

[21] Appl. No.: 20,998

[22] Filed: Mar. 2, 1987

[30] Foreign Application Priority Data

Feb. 28, 1986 [JP] Japan .................................. 61-41952
Feb. 5, 1987 [JP] Japan .................................. 62-23491

[51] Int. Cl.$^4$ ............................................. B65D 90/02
[52] U.S. Cl. .................................. 428/36.7; 215/1 C; 220/453
[58] Field of Search ................. 215/1 L; 428/35; 220/453, 468

[56] References Cited

U.S. PATENT DOCUMENTS 4,307,137 12/1981 Ota et al. .............................. 428/35
4,528,219 7/1985 Yamada et al. ....................... 428/35

FOREIGN PATENT DOCUMENTS

59-6216 2/1984 Japan .

Primary Examiner—George F. Lesmes
Assistant Examiner—James J. Seidleck
Attorney, Agent, or Firm—Sughrue, Mion, Zinn, Macpeak & Seas

[57] ABSTRACT

The present invention is based on the finding that when a multi-layer blow-formed body is heat-treated, cooled and taken out, an intermediate layer of a gas-barrier resin in the multi-layer blow-formed body acts as a heat-insulating layer and if the blow-formed body is cooled from the interior by a cooling fluid, a shape-retaining property necessary for taking out the blow-formed body from the mold can be promptly obtained. A biaxially drawn polyester vessel excellent in the resistance to thermal contraction and gas-barrier properties can be prepared at a high manufacturing speed with a reduced number of steps by preheating or temeprature-adjusting a multi-layer preform comprising inner and outer layers of a polyester composed mainly of ethylene terephthalate units and at least one intermediate layer composed of a gas-barrier resin to a temperature suitable for drawing, carrying out the biaxial draw-blow forming of the preform and the heat treatment of the blow-formed body in a mold maintained at a heat-setting temperature, changing over a compressed fluid for the blow-forming to a fluid for internal cooling, cooling the blow-formed body to a temperature at which deformation is not caused when the blow-formed body is taken out from the mold, while contacting the blow-formed body with the surface of the mold cavity, and taking out the formed body from the mold.

4 Claims, 6 Drawing Sheets

BIAXIALLY DRAWN POLYESTER VESSEL HAVING RESISTANCE TO HEAT DISTORTION AND GAS BARRIER PROPERTIES AND PROCESS FOR PREPARATION THEREOF

BACKGROUND OF THE INVENTION (1) Field of the Invention

The present invention relates to a heat-resistant multi-layer drawn polyester vessel. More particularly, the present invention relates to a process in which a multi-layer drawn polyester vessel comprising a layer of a thermoplastic polyester such as polyethylene terephthalate and a gas-barrier resin layer is efficiently prepared by using only one mole, and also to a drawn polyester vessel excellent in heat resistance, resistance to thermal contraction and resistance to heat distortion, which is prepared according to this process.

(2) Description of the Prior Art

A drawn bottle composed of polyethylene terephthalate (PET) is excellent in transparency, impact resistance (strength against falling shock), light weight, sanitary characteristics, gas barrier properties to oxygen, carbon dioxide gas and the like and pressure resistance, and this bottle is widely used as a packaging vessel for soy sauce, sauce, dressing, edible oil, carbonated drinks such as beer, cola and soda pop, fruit juice, mineral water, shampoo, detergent, cosmetics, wine, mustard and aerosol.

In case of a glass bottle or a metal can in which sealing is complete, the gas permeability is regarded as being substantially zero, but a drawn polyester vessel which is a kind of a plastic vessel has a permeability to oxygen, carbon dioxide gas or the like though it is very slight. Accordingly, the drawn polyester vessel is inferior to a metal can or glass bottle in the content-preserving property, and in case of a carbonated drink, carbon dioxide gas is lost and in case of beer, cola or soda pop, the storage period is definitely limited. Furthermore, in a juice-containing liquid, the storage period is similarly limited because of permeation of oxygen from the outside.

As means for eliminating this defect, there has been proposed a vessel having a multi-layer structure comprising inner and outer layers of a polyester and an intermediate layer of a gas-barrier resin such as an ethylene/vinyl alcohol copolymer or a metaxylylene group-containing polyamide.

The drawn polyester vessel is much superior to other plastic bottles in transparency and pressure resistance in case of a gas-incorporated drink, but the draw-forming temperature of the drawn polyester vessel is relatively low (80° to 110° C.) and there is present an undrawn portion or a lowly drawn portion. Accordingly, the heat resistance is poor and in case of hot packing, a practically applicable product cannot be obtained unless the filling temperature is lower than 65° C., and the shape-retaining property is lost if hot packing is carried out at a higher temperature.

As means for eliminating this defect, there has been proposed a method in which an undrawn portion of a polyester bottle (such as a mouth-neck portion) and a drawn portion (such as a barrel portion) are heat-treated (heat-set). As this heat treatment method, there are known a so-called one-mole method in which a mold for draw-blow forming is maintained at a high temperature for the heat treatment, after draw-blow forming the heat treatment is carried out in this mold and the product is cooled in the mold and taken out from the mold (see, for example, Japanese patent publication No. 6216/84) and a so-called two-mold method in which a mold for draw-blow forming is maintained at a high temperature for the heat treatment, after draw-blow forming the heat treatment is carried out in the mold, the draw-blow-formed product is taken out and put in a cooling mold and the product is cooled in the secondary mold under inflation (see, for example, Japanese patent application Laid-Open Specification No. 53326/82).

A conventional single-layer PET bottle has appropriate gas barrier properties, but in view of the technical level at the present, this PET bottle is still insufficient in the kind of the content and the transportation form. As means for improving the gas barrier properties of a polyester, there has been proposed a method in which a multi-layer structure is formed. However, this method is not practically carried out. Moreover, a method for improving the heat resistance and the resistance to heat distortion while maintaining excellent gas barrier properties has not been proposed.

In the case where the heat treatment is carried out at the draw-blowing step, the formed body is cooled by cooling the blow mold by passing cooling water in the mold, and the temperature of the formed body is lowered to a temperature at which withdrawal of the formed body from the mold is possible. Then, the formed body is taken out from the mold, and an intended heat-treated polyester bottle is obtained.

However, in the former one-mold heat treatment method, since the heat treatment and the interior cooling treatment are carried out in one blow mold and a certain time is necessary for each treatment, the residence time in one mold becomes long and the forming time is 2 to 4 times as long as the forming time in ordinary draw-forming of a polyester bottle, resulting in drastic reduction of the production efficiency and increase of the manufacturing cost. Moreover, if the heat treatment temperature is elevated, a long time is necessary for lowering the temperature to a level at which the formed body can be taken out from the mold. Accordingly, the heat treatment is naturally lowered, and the obtained bottle is inferior in the heat resistance and the resistance to thermal contraction.

In the latter two-mold heat treatment method, two kinds of molds and two-staged blowing operation are necessary and the step number is increased, resulting in increase of the equipment cost. In order that the primarily blow-formed body taken out after the heat treatment is put in a secondary mold assuredly, the size of the primarily blow-formed body should be smaller than the size of the final formed body while the safety rate is taken into consideration. Accordingly, certain expansion drawing should be performed to some extent at the secondary blowing step and thermal contraction corresponding to this expansion drawing at the second stage of blowing is readily caused. Moreover, the two-mold method is defective in that it is difficult to faithfully reproduce the surface configuration of the mold cavity on the surface of the blow-formed body.

SUMMARY OF THE INVENTION

It is a primary object of the present invention to provide a process in which the above-mentioned defects of the conventional processes for the production of heat-set biaxially drawn polyester vessels are overcome and a biaxially drawn polyester vessel excellent in the combination of the resistance to thermal contraction and gas barrier properties is prepared at a high manufacturing speed by using only one mold and shortening the residence time of the blow-formed body in the mold as much as possible.

According to the present invention, a biaxially drawn polyester vessel excellent in the resistance to thermal contraction and gas barrier properties is obtained at a high manufacturing speed with a reduced number of steps by preheating or temperature-adjusting a multi-layer preform comprising inner and outer layers of a polyester composed mainly of ethylene terephthalate units and at least one intermediate layer composed of a gas-barrier resin to a temperature suitable for drawing, carrying out the biaxial draw-blow forming of the preform and the heat treatment of the blow-formed body in a mold maintained at a heat-setting temperature, changing over a compressed fluid for the blow-formed body to a fluid for internal cooling, cooling the blow-formed body to a temperature at which deformation is not caused when the blow-formed body is taken out from the mold, while contacting the blow-formed body with the surface of the mold cavity, and taking out the formed body from the mold.

The present invention is based on the novel finding that the intermediate layer of the gas barrier resin acts as a heat-insulating layer during the heat treatment, cooling and withdrawal of the blow-formed body and by cooling the blow-formed body from the interior by a cooling medium, a shape-retaining property necessary for the withdrawal of the blow-formed body can be promptly obtained.

If the above-mentioned preparation process of the present invention is applied to the production of a multi-layer polyester vessel having in the circumferential direction thereof a pillar convexity having a relatively large diameter and a short circumference and a panel-like concavity having a relatively small diameter and a long circumference and having such a function that the panel-like concavity is expanded and contracted in the direction of the diameter of the vessel according to the change of the pressure in the vessel, a biaxially drawn gas barrier polyester vessel, in which the inner and outer layers in the panel portion are biaxially and molecularly oriented so that the in-plane orientation degree (l+m) measured according to the polarization fluorometry is at least 0.350 and the inner and outer layers in the panel portion are heat-set so that the crystalllization degree of the outer layer determined according to the density measurement is at least 30% and is higher by at least 2% than that of the inner layer, is obtained.

DETAILED DESCRIPTION OF THE PREFERRED EMBODIMENTS (Principle of the Invention)

Figure 1:
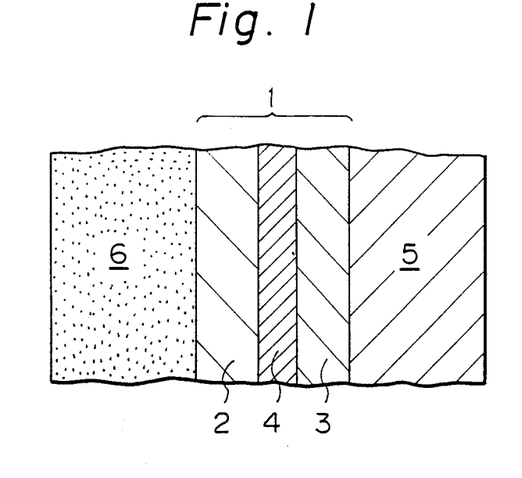
FIG. 1 is a diagram illustrating the principle of the preparation process of the present invention.

Referring to FIG. 1 illustrating the principle of the present invention, a multi-layer blow-formed body 1 comprises an inner polyester layer 2, an outer polyester layer 3 and an intermediate gas-barrier resin layer 4 located intermediately between the layers 2 and 3. At the cooling stage after the heat treatment, the outer polyester layer 3 is heated by contact with a mold 5 heated at a heat-setting temperature, while the inner polyester layer 2 is cooled by contact with a cooling fluid 6. In the present invention, since the intermediate gas-barrier resin layer 4 acts as a heat transfer barrier layer, the inner polyester layer 2 is promptly cooled to a temperature at which the formed body can be taken out without deformation, generally to a temperature lower than 60° C., while the temperature of the outer polyester layer 3 and the mold 5 contacted therewith is not greatly lowered by this operation of cooling the inner layer 2.

Temperature conductivities of various resins are shown in Table 1.

TABLE 1

| Resin | Temperature Conductivity ($\times 10^{-4}$ m$^2$/hr) |
| --- | --- |
| nylon 6/nylon 66 copolymer | 2.70 to 2.90 |
| m-xylene adipamide resin | 2.45 to 2.50 |
| vinylidene chloride resin | 2.50 to 2.65 |
| EVOH | 2.00 to 2.55 |
| drawn PET | 6.40 to 7.80 |
| undrawn PET | 4.90 to 5.55 |

From the data shown in Table 1, it is seen that the heat conductivity of a gas-barrier resin such as an ethylene/vinyl alcohol copolymer (EVOH) is low and corresponds to $\frac{1}{2}$ to $\frac{1}{3}$ of the heat conductivity of polyethylene terephthalate (PET). The ethylene/vinyl alcohol copolymer not only has gas barrier properties but also acts as a barrier to the conduction of heat.

According to the present invention, cooling of the inner polyester layer for imparting a shape-retaining property sufficient to take out the formed body from the mold is promptly accomplished, and the surface temperature of the mold necessary for the heat treatment is not greatly lowered. Accordingly, the heat treatment of the draw-blow-formed article and the cooling for taking out the formed article can be promptly accomplished.

(Materials of Vessel)

As the polyester used for the inner and outer layers in the present invention, there can be mentioned polyethylene terephthalate and a copolyester comprising ethylene terephthalate units as the main units and a small amount of units of a known modifying ester. It is sufficient if the polyester has a film-forming molecular weight.

A copolymer obtained by saponifying a copolymer of ethylene with a vinyl ester such as vinyl acetate is used as the gas-barrier resin for the intermediate layer in the present invention. In view of the formability and barrier properties, a copolymer having an ethylene content of 15 to 60 mole %, especially 25 to 50 mole %, and a saponification degree of at least 96% is advantageously used in the present invention. Furthermore, there may be used a vinylidene chloride resin, a high-nitrile resin, a xylylene group-containing polyamide resin and a high-barrier polyester.

In order to improve the adhesiveness between the polyester layer and the gas-barrier resin layer, a known optional adhesive may be used, though use of the adhesive is not always necessary. For this purpose, a copolyester type adhesive, a polyamide type adhesive, a polyester-ether type adhesive, an epoxy-modified thermoplastic resin and an acid-modified thermoplastic resin can be used.

(Multi-Layer Preform)

For the production of a multi-layer preform comprising thermoplastic polyester and gas-barrier resin layers, there can be adopted a method in which a pipe is formed by using a gas-barrier resin for at least one intermediate layer and a polyester resin for inner and outer layers, while interposing an adhesive layer if necessary, according to the co-extrusion method, the multi-layer pipe is cut into an appropriate length, one end of the cut pipe is fusion-closed to form a bottom and a mouth-neck portion having an opening at an upper part and a fitting or screw part on the periphery is formed on the other end of the pipe, whereby a multi-layer preform is obtained.

Furthermore, a multi-layer having a bottom and opening corresponding to the configuration of an injection preform mold can be obtained by using a co-injection molding machine provided with at least 2 injectors and a co-injection mold and inserting at least one layer of a gas-barrier resin between inner and outer layers of a polyester resin so that the intermediate layer is covered with the inner and outer layers.

Moreover, a multi-layer preform can be prepared according to a method using a multi-staged injection molding machine provided with at least 3 injectors and a plurality of molds, in which a primary inner layer preform is first formed, the preform is transferred to a second mold, an intermediate layer is injected and an outer layer is injected in a third mold.

In order to impart a heat resistance to the so-obtained preform, the neck portion having a screw part, a fitting part and a supporting ring is sometimes crystallized and whitened in the state of the preform by a heat treatment. Alternatively, there may be adopted a method in which an undrawn neck portion of a bottle formed by biaxial draw-blowing described hereinafter is crystallized and whitened.

(Preparation of Vessel)

The temperature of the so-prepared multi-layer preform is adjusted to a drawing temperature of 85° to 115° C. by utilizing the heat given to the preform by the injecting machine, that is, the remaining heat, or when temperature of 85° to 115° C. When the preform is biaxially drawn in a blow mold, the blow mold is heated at 120° to 230° C., preferably 120° to 210° C., and simulta- 120° to 230° C., preferably 120° to 210° C., and simultaneously with the contact of PET of the outer layer of the wall of the draw-blown multi-layer preform with the inner surface of the mold, the heat treatment (heat setting) is initiated. After passage of a predetermined heat treatment time, the blowing fluid is changed over to a fluid for internal cooling to initiate the cooling of PET of the inner layer. The heat treatment time is changed according to the thickness of the blow-formed body or the temperature, but the heat treatment time is generally 1.5 to 30 seconds and especially 2 to 20 seconds. The cooling time is changed according to the heat treatment temperature or the kind of the cooling fluid, but the cooling time is generally 1 to 30 seconds and especially 2 to 20 seconds.

As the cooling fluid, there can be used various cooled gases such as nitrogen, air and carbon dioxide gas maintained at −40° to +10° C., and chemically inert liquefied gases such as liquefied nitrogen gas, liquefied carbon dioxide gas, liquefied trichlorofluoromethane gas, liquefied dichlorodifluoromethane gas and other liquefied aliphatic hydrocarbon gases. A liquid mist having a large gasification heat, such as water, may be co-present with the cooling fluid. By using the above-mentioned cooling fluid, an especially high cooling speed can be obtained.

PET of the outer layer of the blow-formed body is naturally cooled or positively cooled by blowing cold air to the blow-formed body.

In order to shut the heat transfer, the gas-barrier intermediate layer should have a thickness of at least 5 $\mu$m on the average in the barrel wall portion of the formed vessel, but if the thickness exceeds 300 $\mu$m, the draw formability tends to be degraded. It is generally preferred that the thickness of the intermediate layer in the barrel wall portion be 20 to 80 $\mu$m. In view of the shape-retaining property at the step of taking out the formed vessel, the inner layer of PET should have a thickness of at least 25 $\mu$m in the barrel wall portion and this thickness is preferably 25 to 70 $\mu$m. It is preferred that the thickness of the outer layer of PET be 25 to 200 $\mu$m in the barrel wall portion and the inner layer/outer layer thickness ratio be from 1/8 to 3/1, though the preferred thickness ratio differs to some extent according to the preparation process.

The process for preparing a thermoplastic polyester bottle according to the present invention will now be described in detail with reference to the accompanying drawings.

Figure 2:
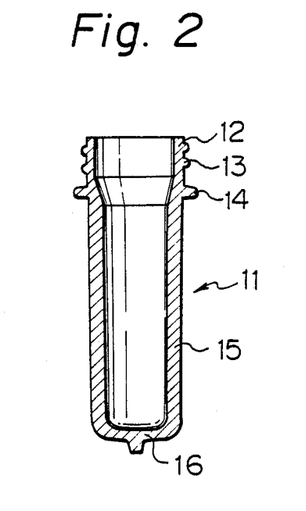
FIG. 2 is a sectional side view illustrating a preform used in the present invention.

FIG. 2 shows a multi-layer preform obtained by co-extrusion molding or co-injection molding. This preform 11 comprises a mouth-neck portion 12, a screw portion 13, a support ring (neck ring) 14, a long cylinder 15 and a bottom 16.

Figure 3:
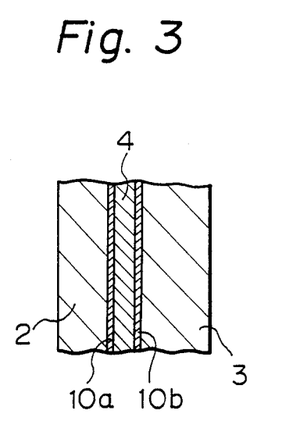
FIG. 3 is an enlarged sectional view illustrating the sectional structure of the preform shown in FIG. 2.

FIG. 3 shows the section of the wall portion of the multi-layer preform. The multi-layer structure of the preform comprises inner and outer layers 2 and 3 composed of a thermoplastic polyester, an intermediate layer 4 composed of a gas-barrier resin such as an ethylene/vinyl alcohol copolymer and adhesive layers 10a and 10b interposed between the layers 2 and 4 and between the layers 3 and 4 according to need.

The preform shown in FIG. 2 is heated at a temperature suitable for drawing by hot air heating, infrared ray heating or high frequency heating. This temperature suitable for drawing is 85° to 115° C., preferably 90° to 110° C.

Figure 4:
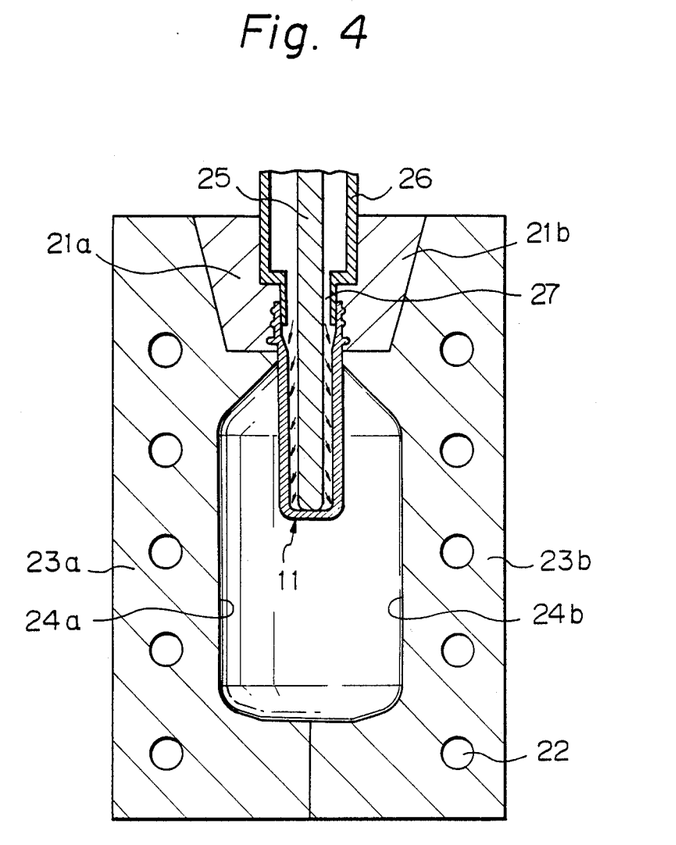
FIG. 4 is a sectional side view illustrating the draw-blowing step.
Figure 5:
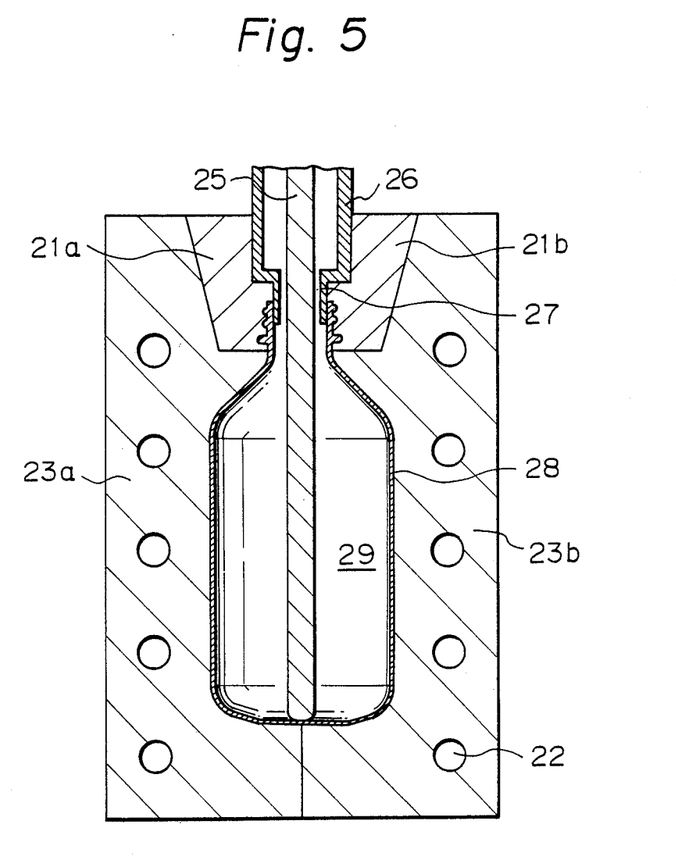
FIG. 5 is a sectional side view illustrating the heat-setting and cooling steps.

The draw-blowing step (heat-treating step) will now be described with reference to FIGS. 4 and 5.

The neck portion of the preform 11 is held by lip cavities 21a and 21b and the other portion of the preform is arranged in cavities 24a and 24b of a blow mold 23a, 23b having a heater 22 built therein for heating the preform at a desired heat treatment temperature, and simultaneously, a mandrel 26 provided with a drawing rod 25 is inserted into the preform 11 from the mouth portion thereof. The drawing rod 25 is movable in the vertical direction. A fluid path 27 is formed between the drawing rod 25 and mandrel 26.

In the present invention, the blow mold 23a, 23b is heated at a desired heat treatment temperature of 110° to 230° C., and the preform 11 maintained at the drawing temperature is set in this mold and the preform 11 is drawn in the axial direction while applying the top end of the drawing rod 25 to the inner side of the bottom of the preform 11. Simultaneously, a compressed gas is blown into the preform 11 through the fluid path 27 to expand and draw the preform 11 in the circumferential direction and obtain a blow-formed article 28 (see FIG. 4). The draw ratio is not particularly critical, but it is generally preferred that the draw ratio be 1.5 to 3 in the axial direction and 3 to 5 in the circumferential direction.

Subsequently, the blow-formed body is contacted with the surfaces of the cavities 24a and 24b and heat-treated in the state where the inner pressure of the compressed fluid is applied to the blow-formed body. Then, the compressed fluid for blowing is changed over to a cooling fluid, and the cooling fluid is introduced through the fluid path 27 and the interior 29 of the formed body is filled with the cooling fluid to effect cooling for taking out the formed body.

In the preparation process of the present invention, since only one kind of a mold and a single blowing operation are necessary, a heat-set biaxially drawn blow-formed vessel can be prepared with a reduced number of steps and a reduced equipment cost, and furthermore, the time of the heat treatment in the mold and the time of cooling for taking out the formed body from the mold can be greatly shortened and the residence time in the mold can be greatly shortened. Accordingly, a biaxially drawn polyester vessel excellent in the combination of the resistance to thermal contraction and gas barrier properties can be prepared at a high manufacturing speed.

(Vessel)

The so-obtained vessel is excellent in the heat resistance and the resistance to thermal contraction so that heat distortion or thermal contraction is not caused even if hot filling is carried out at a high temperature exceeding 80° C., and the vesssel has high transparency and gas-barrier properties.

Moreover, since the preparation process is a one-stage blow-forming process, the obtained vessel is excellent in the property of reproducing the surface configuration and hence, the vessel is excellent in surface characteristics such as the aesthetic effect and the commercial value.

In case of the two-mold method, two pairs of parting lines corresponding to the two split molds used are formed on the final vessel. On the other hand, in the vessel prepared according to the present invention, only one pair of parting line is formed on the left and right sides, and the surface characteristics are improved.

If the above-mentioned preparation process of the present invention is applied to the production of a multi-layer polyester vessel having in the circumferential direction of the barrel portion thereof a pillar convexity having a relatively large diameter and a short circumference and a panel-like concavity having a relatively small diameter and a long circumference, primary asymmetric deformation of the panel portion at the time of hot filling or secondary asymmetric deformation of the barrel portion at the time of subsequent cooling can be prevented and good appearance characteristics can be maintained.

Figure 6:
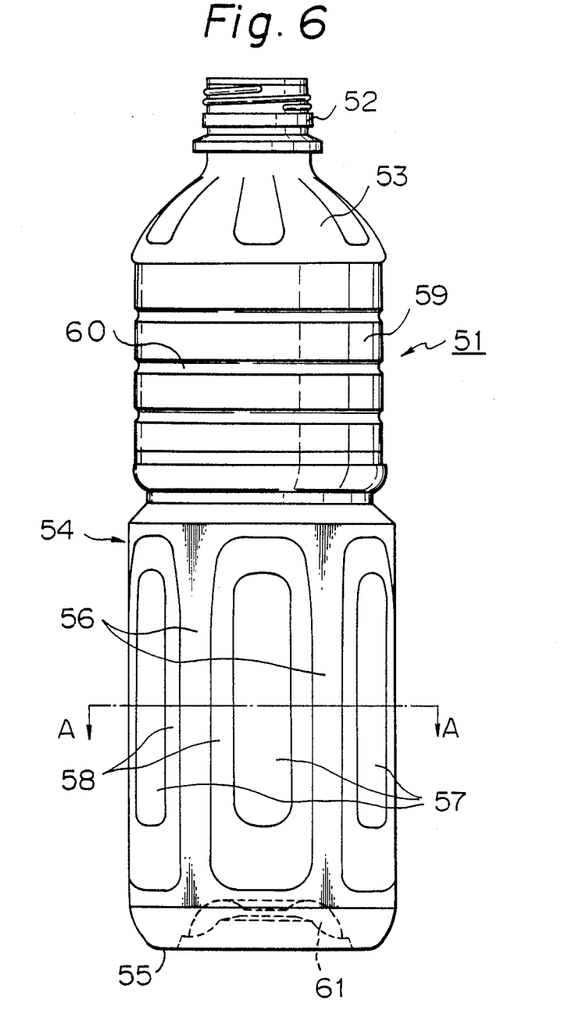
FIG. 6 is a side view illustrating an example of the vessel of the present invention.
Figure 7:
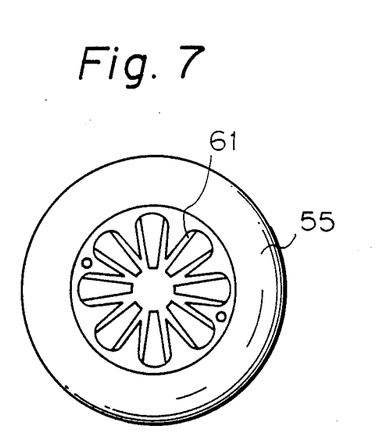
FIG. 7 is a bottom view of the vessel shown in FIG. 6.
Figure 8:
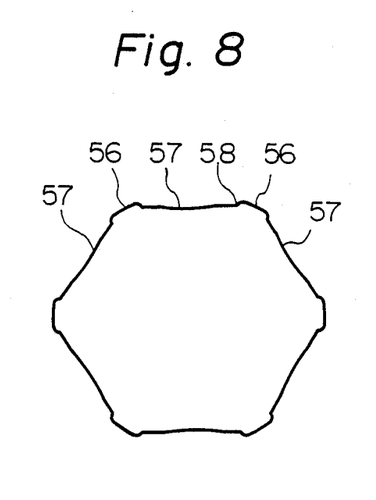
FIG. 8 is a view showing the section taken along the line A—A in FIG. 6.

Referring to FIG. 6 (side view), FIG. 7 (bottom view) and FIG. 8 (sectional view) illustrating an example of the vessel of this type, this biaxially drawn polyester vessel 51 comprises an undrawn nozzle portion (neck portion) 52, a frustoconical shoulder portion 53, a cylindrical barrel portion 54 and a closed bottom portion 55.

In the main area of the barrel portion 54, pillar convexities 56 having a relatively large diameter and a short circumference and panel-like concavities 57 having a relatively small diameter and a long circumference are formed alternately in the circumferential direction through short connecting portions 58.

Each pillar convexity 56 extends in the axial direction (height direction) of the vessel. Accordingly, each panel-like concavity 57 has a long rectangular shape defined by the pillar convexity 56, which is long in the axial direction of the vessel and has rounded corners.

As is understood from the sectional view of FIG. 8, the panel-like concavity 57 is expanded outwardly of the diameter (projected) by increase of the inner pressure and is contracted inwardly (depressed) by decrease of the inner pressure, whereby the change of the inner pressure is moderated.

In the embodiment illustrated in the accompanying drawings, bulged ring portions 59 having a relatively large diameter and adjacent groove-like ring portions 60 having a relatively small diameter are formed above the area where the panel-like concavities 57 are formed, so that certain deformation in the axial direction of the vessel is allowed.

An asterial, inwardly concave pat 61 is formed at the center of the bottom portion 55, whereby outward buckling of the bottom portion 55 by the pressure or heat distortion can be prevented.

Of course, this vessel has a multi-layer sectional structure as shown in FIG. 3.

In the present invention, a multi-layer polyester vessel having the above-mentioned wall configuration and structure is prepared according to the above-mentioned preparation process using a blow mold having a cavity space corresponding to the shape of the vessel. The so-obtained vessel is characterized in that the inner and outer polyester layers in the panel-like portion are biaxially and molecularly oriented so that the in-plane orientation degree (l+m) measured by the polarization fluorometry is at least 0.350 and the vessel is heat-set so that the crystallization degree of the outer layer in the panel-like portion, determined by the density measurement, is at least 30% and is higher by at least 2% than the crystallization degree of the inner layer.

In order to impart sufficient rigidity, creep resistance and transparency to the panel-like portion and produce such a molecular orientation as controlling formation of spherulites at the heat-setting step, it is important that both of the inner and outer polyester layers should have an in-plane orientation degree (l+m) of at least 0.350 as determined by the polarization fluorometry.

The density is ordinarily used as a factor indicating the molecular orientation of a polyester. However, the density of a polyester is greatly changed according to not only the degree of molecular orientation but also the degree of heat setting (that is, the crystallization degree). Accordingly, the density cannot be used as a parameter of the molecular orientation in the present invention.

In contrast, in the polarization fluorometry, the molecular orientation of a polymer is quantitatively measured by utilizing an optical anisotropy of the fluorescent molecule adsorbed in the molecularly oriented polymer, and therefore, the molecular orientation degree can be determined without being influenced by heat setting. The two-dimensional orientation degree in the vessel wall, determined by the polarization fluorometry, is represented by the following formula:

$$I^{\prime\prime}(\omega) = K\phi(l\cos^4\omega + m\sin^4\omega + \tfrac{3}{8}n) \quad (1)$$

wherein $I^{\prime\prime}(\omega)$ indicates the intensity of the polarization component of the fluorescence emitted from the thermoplastic resin sample, $^{\prime\prime}$ indicates that the vibration direction of the incident polarization is in parallel to the measured polarization degree, $\omega$ indicates the rotation angle of the sample to the vibration direction of the polarization, K stands for the maximum excitation probability when the molecular axis of the sample is in parallel to the vibration direction of the excited fluorescence $\phi$ stands for the molecular fluorescence efficiency, l represents the ratio of the molecular orientation in one optional direction in the wall plane of the final formed vessel, m stands for the ratio of the molecular orientation in the direction orthogonal to the direction l, n designates the ratio of in-plane non-orientation, and the sum of l, m and n in equal to 1.

The intensity $I^{\prime\prime}(\omega)$ of the polarization component is measured with respect to different values (0°, 45° and 90°) of $\omega$, and values of l, m and n are determined as solutions of three simultaneous equations.

In the above-mentioned preparation process, by adjusting the heating temperature of the preform to 85° to 115° C. at the draw-blow forming step and also adjusting the draw ratio to at least 1.5 in the longitudinal direction and at least 3.0 in the circumferential direction while preferably adjusting the temperature of the blow mold (heat-setting temperature) to 120° to 230° C., the in-plane orientation degree (l+m) can be maintained at a level of at least 0.350.

The multi-layer vessel is in the heat-set state such that in the panel-like portion, the crystallization degree of the polyester resin of the outer layer is at least 30% and is higher by at least 2%, especially by at least 3%, than that of the polyester resin of the inner layer.

In the drawn multi-layer polyester vessel, the polyester of the outer layer is selectively and highly crystallized, and therefore, by the hoop effect of the crystallized polyester of the outer layer, occurrence of non-uniform primary heat distortion (asymmetric defomation) at a part of the panel portion at the step of hot filling of the content can be prevented, and at the subsequent sealing and cooling steps, the expansion-contraction of the panel portion is normally exerted and ugly asymmetric deformation (secondary asymmetric distortion) of the vessel after cooling can be effectively prevented.

In the production of the multi-layer polyester vessel according to the present invention, the entire polyester is not uniformly heat-set, but the polyester layer located on the outer side of the gas-barrier layer is concentratedly heat-set and the polyester of the outer layer is selectively and highly crystallized.

Furthermore, in the vessel of the present invention, since the outer portion is highly crystallized, the surface is hardly damaged, and since the crystallization degree of the inner portion is low, the resistance to a falling shock is highly improved.

In the drawn polyester vessel of the present invention, it is preferred that the size of the panel-like concavity be 10 to 50 mm in the circumferential direction and 40 to 160 mm in the axial direction (the direction of the height), though the preferred size varies to some extent according to the size of the vessel. Furthermore, it is preferred that the step between the pillar convexity having a relatively large diameter and the panel-like portion having a relatively small diameter, that is, the difference of the diameter between the two portions, be within the range of from 1 to 8 mm.

The drawn polyester vessel of the present invention is valuable as a sealed preserving vessel in which the content is hot-filled at a temperature of 70° to 98° C. or which is heat-sterilized at 70° to 95° C. after filling.

The present invention will now be described in detail with reference to the following examples that by no means limit the scope of the invention.

Incidentally, the following measurement and calculation methods were adopted in the examples.

(1) Crystallization degree x

A small piece (about 2 mm × about 2 mm) of a sample to be measured was sedimented in a normal heptane/carbon tetrachloride density-gradient tube set at 20° C., and the measured specific gravity d was determined from the position where the sample became stationary.

The crystallization degree x was calculated from the obtained measured specific gravity d according to the following equation:

$$(1/d) = [(1-x)/da] + (x/dc)$$

wherein da stands for the value of the specific gravity when the crystallization degree is 0% (da=1.335), and dc stands for the value of the specific gravity when the crystallization degree x is 100% (dc=1.455).

(2) Oxygen gas permeability $QO_2$ of vessel

A small amount of water was charged in a vessel (bottle) to be measured, and the inner atmosphere was replaced by nitrogen gas in vacuum and the contact surface portion of the mouth of the bottle and the rubber plug was covered with an epoxy type adhesive. The bottle was stored for 7 weeks in a thermostat tank maintained at a temperature of 22° C. and a relative humidity of 60%.

The concentration of oxygen which had permeated into the bottle was measured by a gas chromatograph, and the oxygen permeability $PO_2$ (cc/m$^2$·day·atm) of the vessel was calculated according to the following formula:

$$QO_2 = [m \times Ct/100]/t \times OP \times A$$

wherein m stands for the amount (ml) of nitrogen gas filled in the bottle, t stands for the storage period (day) in the thermostat tank (t=49), Ct stands for the oxygen concentration (% by volume) after passage of t days, OP stands for the partial pressure (atm) of oxygen gas (OP=0.209), and A stands for the effective surface area (m$^2$) of the bottle, With respect to one kind of a bottle, the oxygen gas permeabilities $QO_2$ of five samples were measured and the arithmetic mean was calculated and shown.

(3) Heat resistance (heat distortion ratio) S

A sample (bottle) to be measured was completely filled with city water, and the completely filled amount Vo (ml) was measured in advance.

The bottle was completely filled with hot water maintained at 85° C., and the bottle was capped and held for 3 minutes. Then, the bottle was water-cooled until the temperature of the content (city water) was lowered to room temperature (20° C.). Then, the bottle was checked and evaluated by 11 panelists according to the following standard:
O: no deformation
Δ: slight deformation
X: definite deformation The content was withdrawn from the sample, and city water maintained at 20° C. was completely filled in the sample, and the completely filled amount $V_1$ (ml) was measured.

The heat resistance (heat distortion ratio) S (%) was calculated according to the following formula:

$$S = 100 \times (V_1/V_0 - 1)$$

With respect to one kind of a bottle, the heat distortion ratios S of five samples were determined, and the arithmetic mean was calculated and shown.

Example 1

According to the process disclosed in Japanese patent application Laid-Open No. 254325/86, polyethylene terephthalate (PET, temperature conductivity=$5.55=10^{-4}$ m$^2$/hr) having a viscosity (intrinsic viscosity) of 0.75 was supplied to a main injector and a metaxylylene adipamide resin (MXD6 supplied by Mitsubishi Gas Chemical Company, temperature conductivity=$2.45 \times 10^{-4}$ m$^2$/hr) was supplied to a subsidiary injector, and a two-resin three-layer preform was formed by co-injection. More specifically, primary injection was carried out under a pressure of about 60 kg/cm$^2$ from the main injector for 1.3 seconds, and then, injection of PET was stopped for 0.1 second. A predetermined amount (about 8% by weight) of molten MXD6 was injected from the subsidiary injector under a pressure (about 120 kg/cm$^2$) higher than the primary injection pressure after passage of 1.4 seconds from the point of initiation of the injection of PET. Furthermore, PET was injected from the main injector under a pressure (about 40 kg/cm$^2$) lower than the primary injection pressure after passage of 0.05 second from the point of initiation of the injection of MXD6. Thus, a multi-layer preform having a thickness of about 4 mm was formed. The weight of the preform was 59.0 g and the ratio of MXD6 was 7.8% by weight, and the inner layer PET/outer layer PET thickness ratio was 2/5.

By using a biaxial draw-blow forming machine (Model OBM-1G supplied by Toyo Food Equipment Company), the multi-layer preform was preliminarily heated at 100° C. and was biaxially drawn in a blow mold having the inner surface of the cavity heated at 160° C. and having an inner volume of about 1580 ml, and simultaneously, the preform was heat-set for 9 seconds. The blowing fluid was changed over to an internal cooling fluid (air maintained at +5° C.) and the fluid pressure was applied for 10 seconds again, and immediately, the formed body was taken out and naturally cooled to obtain a cylindrical bottle having an inner volume of 1515 ml, as shown in FIG. 6. The size of the panel-like concavity of the barrel of the bottle was 35 mm in the circumferential direction and 137 mm in the axial direction (the direction of the height O, and the step between the pillar convexity and the panel-like concavity, that is, the difference of the diameter, was 6.5 mm. This bottle is designated as "bottle A".

For comparison, by using the above-mentioned biaxial draw-blow forming machine, the multi-layer preform was preliminarily heated at 100° C. and biaxially draw-blown for 254 seconds in a blow mold having the cavity surface set at 19±2° C. and having an inner volume of about 1580 ml without performing the above-mentioned heat-setting operation, whereby a cylindrical bottle having an inner volume of 1547 ml, as shown in FIG. 6, was obtained. The shape and size of the barrel of the obtained bottle were substantially the same as those mentioned above. This bottle is designated as "bottle B".

In each of the so-obtained PET/MXD6/PET three-layer bottles A and B, the inner layer (PET), intermediate layer (MXD6) and outer layer (PET) were quiet peeled and the in-planer orientation degrees (l+m) of the inner and outer layers were measured according to the above-mentioned polarization fluorometry by using a polarization fluorophotometer (Model FOM-2 supplied by Japan Spectroscopic Company Ltd.). The measurement was effected at 4 points P1 through P4, shown in the abscissa of FIG. 9, in the axial direction of the bottle and at 6 points in the circumferential direction of the panel portion of the bottle, that is, at 24 points as a whole of the respective panel portions, and the arithmetic mean was calculated.

In the bottle A, the in-plane orientation degree (l+m) of PET of the inner layer was 0.813 and the in-plane orientation degree (l+m) of PET of the outer layer was 0.756, and in the bottle B, the in-plane orientation degree (l+m) of PET of the inner layer was 0.394 and the in-plane orientation degree (l+m) of PET of the outer layer was 0.343.

The crystallization degree, oxygen gas permeability and heat resistance were determined according to the above-mentioned measurement and calculation methods.

(1) Crystallization degree x

Figure 9:
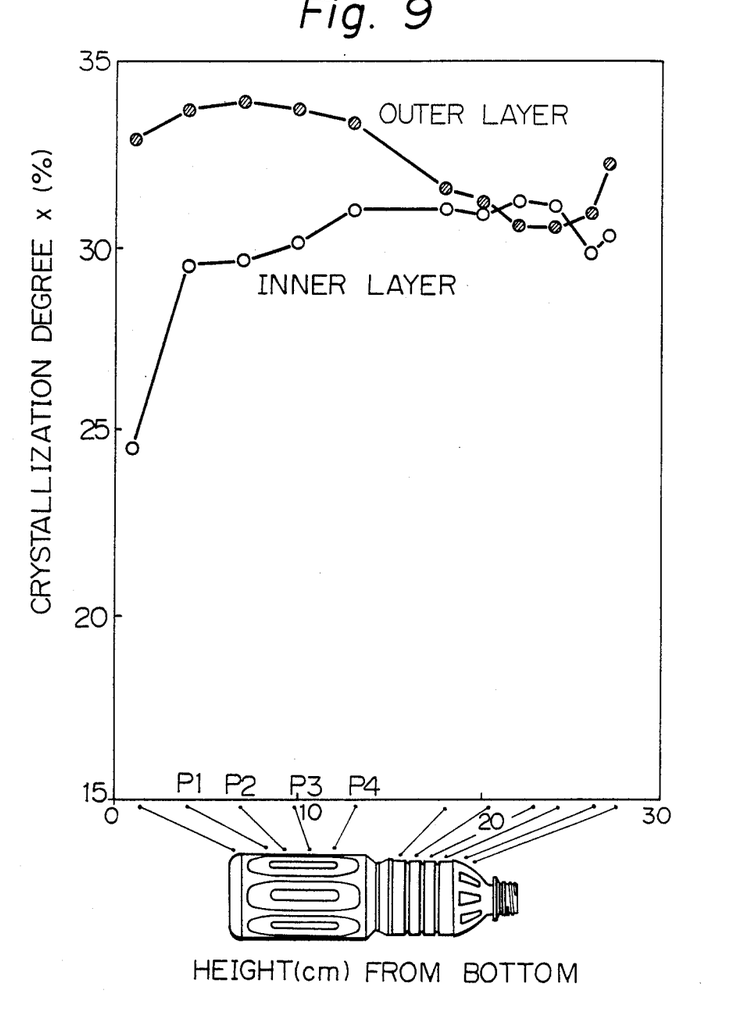
FIG. 9 is a graph illustrating crystallization degrees of outer and inner layers of the vessel obtained in Example 1 at respective positions.

The crystallization degrees x of the respective portions of the bottle A are shown in FIG. 9. In FIG. 9, the abscissa indicates the position (distance from the bottom, cm) in the axial direction (direction of the height) from the bottom of the bottle A, and the ordinate indicates the crystallization degree (%) of the corresponding portion. The crystallization degree x is the arithmetic mean of the values of 6 panel portions in the circumferential direction of the bottle and the values of the corresponding portions in the axial direction of the bottle.

From FIG. 9, it is seen that in case of the bottle A, the difference of the crystallization degree between the inner and outer layers is especially large in the panel portions (portions P1 through P4 in FIG. 9), and in each of these panel portions, the crystallization degree of the outer layer is at least 30% and is higher by at least 2% than the crystallization degree of the inner layer.

For comparison, the crystallization degrees of the portions of the bottle B corresponding to P1 through P4 (the arithmetic mean of the values of 6 points in the circumferential direction) are shown in Table 2. It is seen that the crystallization degree of each outer layer is lower than 30% and the difference of the crystallization degree between the inner and outer layers was less than 2%.

(2) Oxygen gas permeability $QO_2$

The oxygen permeabilities $QO_2$ of the bottles A and B and a comparative single-layer PET bottle (the shape and size of the barrel were substantially the same as described above; the bottle is designated as "bottle C") obtained from a single-layer PET preform having a thickness of about 4 mm and a weight of 59.0 g under the above-mentioned heat-setting conditions by using the above-mentioned biaxial draw-blow forming machine, were measured. The obtained results are shown in Table 3.

The oxygen gas permeability of the bottle A was apparently smaller than the oxygen permeability of the single-layer PET bottle C and also smaller than the bottle B in which the heat-setting operation was not carried out.

(3) Heat resistance

The heat resistance test of the bottles A, B and C was carried out.

In case of the visual test performed by 11 panelists, (i) 10 panelists judged the bottle A as O and one panelist judged the bottle A as Δ, (ii) all of 11 panelists judged the bottle B as X, and (iii) 9 panelists judged the bottle C as O and 2 panelists judged the bottle C as Δ.

At the heat distortion test, (i) the heat distortion ratio S of the bottle A was 0.07±0.02%, (ii) the heat distortion ratio S of the bottle B was 6.59±1.42%, and (iii) the heat distortion ratio S of the bottle C was 0.09±0.04%.

TABLE 2

| Bottle B Position | Crystallization Degree x (%) | | | |
| --- | --- | --- | --- | --- |
| | P1 | P2 | P3 | P4 |
| outer layer | 15.3 | 15.7 | 16.1 | 16.5 |
| inner layer | 15.5 | 15.4 | 15.7 | 15.7 |
| (outer layer) − (inner layer) | −0.2 | +0.3 | +0.4 | +0.8 |

TABLE 3

| | Oxygen Gas Permeability $QO_2$ (cc/m$^2$ · day · atm) | |
| --- | --- | --- |
| | Arithmetic Mean | Standard Deviation Value |
| bottle A | 0.416 | 0.0136 |
| bottle B | 0.558 | 0.0204 |
| bottle C | 4.222 | 0.2511 |

Example 2

According to the process disclosed in Japanese patent application Laid-Open No. 60436/86, polyethylene terephthalate (PET, temperature conductivity of $5.55 \times 10^{-4}$ m$^2$/hr) described in Example 1 was supplied to a main extruder, an ethylene/vinyl alcohol copolymer supplied by Kuraray Company (EVOH, ethylene content = 30.1 mole%, saponification degree = 99.6%, temperature conductivity = $2.00 \times 10^{-4}$ m$^2$/hr) was supplied to a subsidiary extruder for a barrier layer, and a caprolactam/hexamethylene diammonium adipate copolymer (6/66 PA, copolymer having a caprolactam content of 78%, temperature conductivity = $2.85 \times 10^{-4}$ m$^2$/hr) was supplied to an extruder for an adhesive layer.

A three-resin 5-layer pipe having a layer structure of outer layer (PET)/adhesive layer (6/66 PA)/intermediate layer (EVOH)/adhesive layer (6/66 PA)/inner layer (PET) was formed according to the co-extrusion method. The total thickness of the pipe was 3.95 mm, and the outer layer/adhesive layer/intermediate layer/adhesive layer/inner layer thickness ratio was 5/0.2/1/0.2/5.

The multi-layer pipe was cut into a length corresponding to a weight of 59.0 g, and a bottom portion and a neck portion were formed to obtain a 5-layer preform having a weight of 59 g.

By using the biaxial draw-blow forming machine described in Example 1, the multi-layer preform was preliminarily heated at 110° C., the preform was biaxially drawn in a blow mold having a cavity surface heated at 145° C. and having an inner volume of about 1580 ml and simultaneously, the preform was heat-seat for 12 seconds. Then, the blowing fluid was changed over to an internal cooling medium (air adjusted at +5° C.) and the fluid pressure was applied for 9 seconds again. The formed body was immediately taken out and naturally cooled. Thus, a cylindrical bottle having an inner volume of 1521 ml, as shown in FIG. 6, was obtained. The shapes and sizes of the concave and convex portions of the barrel of the bottle were the same as described in Example 1. This bottle is designated as "bottle D".

For comparison, by using the above-mentioned biaxial draw-blow forming machine, the above-mentioned preform was preliminarily heated at 110° C. and biaxially draw-blown for 25 seconds in a blow mold having the cavity surface set at 19±2° C. and having an inner volume of about 1580 ml without performing the above-mentioned heat-setting operation, whereby a cylindrical bottle having an inner volume of 1546 ml was prepared. The shapes and sizes of the concave and convex portions of the barrel of the bottle were substantially the same as described above. This bottle is designated as "bottle E".

In each of the so-obtained 5-layer bottles D and E of the PET/PA/EVOH/PA/PET layer structure, the outer layer (PET), the adhesive and intermediate layers (PA/EVOH/PA) and the inner layer (PET) were quietly peeled, and the in-plane orientation degrees (l+m) of the outer and inner layers were measured by the above-mentioned polarization fluorometry. The measurement procedures and measurement points were the same as in Example 1.

In the bottle D, the in-plane orientation degree (l+m) of PET of the outer layer was 0.366 and the in-plane orientation degree (l+m) of PET of the inner layer was 0.472, and in the bottle E, the in-plane orientation degree (l+m) of PET of the outer layer was 0.310 and the in-plane orientation degree (l+m) of PET of the inner layer was 0.374.

The crystallization degree, oxygen permeability and heat resistance of each of the bottles D and E were determined according to the above-mentioned measurement and calculation methods.

(1) Crystallization degree x

The crystallization degrees x of the panel-like concavities (corresponding to the portions P1 through P4 in FIG. 9) of the barrel of the bottle D are shown in Table 4. From Table 4, it is seen that the crystallization degree of the outer layer in each portion is at least 30% and is higher by at least 2% than the crystallization degree of the inner layer.

For comparison, the crystallization degrees x of the same portions of the bottle E are shown in table 5. From Table 5, it is seen that the crystallization degree of the outer layer of each portion is lower than 30% and the difference of the crystallization degree between the outer and inner layers is less than 2%.

(2) Oxygen gas permeability $QO_2$

The results of the measurement of the oxygen gas permeabilities $QO_2$ of the bottles D and E are shown in Table 6. For comparison, the results of the measurement of the oxygen permeability $QO_2$ of the single-layer PET bottle (bottle C) shown in Table 3 in Example 1 are shown in Table 6.

From the data shown in Table 6, it is seen that the oxygen gas permeability of the bottle D is apparently lower than the oxygen gas permeability of the single-layer PET bottle C and lower than the bottle E in which the heat-setting operation was not performed.

(3) Heat resistance

The heat resistance test was carried out on the bottles D and E.

In case of the heat resistance test performed by 11 panelists, (i) 9 panelists judged the bottle D as O and 2 panelists judged the bottle D as Δ, and (ii) all of 11 panelists judged the bottle E as X.

At the heat distortion test, (i) the heat distortion ratio S of the bottle D was 0.11±0.03% and (ii) the heat distortion ratio S of the bottle E was 6.74±1.37%.

TABLE 4

| Bottle D Position | Crystallization Degree x (%) | | | |
|---|---|---|---|---|
| | P1 | P2 | P3 | P4 |
| outer layer | 36.1 | 36.3 | 36.0 | 35.7 |
| inner layer | 27.1 | 27.3 | 28.4 | 28.8 |
| (outer layer) − (inner layer) | +9.0 | +9.0 | +7.6 | +6.9 |

TABLE 5

| Bottle E Position | Crystallization Degree x (%) | | | |
|---|---|---|---|---|
| | P1 | P2 | P3 | P4 |
| outer layer | 15.1 | 15.4 | 15.5 | 15.7 |
| inner layer | 15.4 | 15.4 | 15.6 | 15.5 |
| (outer layer) − (inner layer) | −0.3 | ±0 | −0.1 | +0.2 |

TABLE 6

| | Oxygen Gas Permeability $QO_2$ (cc/m² · day · atm) | |
|---|---|---|
| | Arithmetic Mean | Standard Deviation Value |
| bottle D | 0.0088 | 0.0075 |
| bottle E | 0.136 | 0.0150 |
| bottle C | 4.222 | 0.2511 |

Example 3

According to the co-extrusion method described in Example 2, a multi-layer pipe as shown in Example 2 was formed from polyethylene terephthalate (PET, temperature conductivity=5.55×10⁻⁴ m²/hr), an ethylene/vinyl alcohol copolymer having an ethylene content of 30 mole% and a vinyl alcohol content of 70 mole% (EVOH, temperature conductivity=2.00×10⁻⁴ m²/hr) and a nylon 6/nylon 66 copolymer having a nylon 66 content of 22 mole% and a nylon 6 content of 78 mole% (AD, temperature conductivity=2.85×10⁻⁴ m²/hr) as the adhesive, and a bottom portion and a neck portion were formed to obtain a multi-layer preform having a weight of 59 g. The PET (outer-layer)/AD/EVOH/AD/PET (inner layer) thickness ratio was 10/0.2/1/0.2/5. Incidentally, AD represents the adhesive layer.

By using the biaxial draw-blow formign machine described in Example 1, the multi-layer preform was preliminarily heated at 100° C. and was biaxially draw-blown in a blow mold having the cavity surface heated at 145° C. and having an inner volume of 1580 cc, and simultaneously, the preform was heat-set for 12 seconds. Then, the blowing fluid was changed over to an internal cooling fluid (air maintained at +5° C.) and the fluid pressure was applied for 9 seconds again, and the formed body was immediately taken out and naturally cooled to obtain a straight wall bottle having no concavity or convexity in the barrel and having an inner volume of 1500 cc.

(Oxygen gas permeability)

The oxygen gas permeability $QO_2$ of the obtained bottle of the present invention was 0.2 cc/m²·day·atm (the storage conditions: relative humidity in bottle=100%, relative humidity outside bottle=60%, storage temperature=22° C.).

The oxygen permeability $QO_2$ of a single-layer PET bottle (having the same weight and inner volume as described above) formed as a comparative bottle was 4.4 cc/m²·day·atm as determined under the same conditions as described above.

(Heat resistance)

The inner volume (Vo, ml) of the obtained bottle of the present invention was measured in advance, and the bottle was filled with warm water maintained at 85° C. and was naturally cooled to room temperature. Then, the inner volume (V₁, ml) of the bottle was measured again.

In the same manner as described above, the heat distortion ratio S of the bottle S was calculated according to the following equation:

$$S=(V_1/V_o-1)\times 100.$$

The value S was −0.2%. Furthermore, no change of the configuration was observed.

Example 4

According to the co-injection method described in Example 1, a multi-layer preform was prepared by supplying polyethylene terephthalate having an intrinsic viscosity of 0.75 (PET, the temperature conductivity was the same as that of PET used in Example 3) to a main injector and a m-xylylene adipamide resin supplied by Toyobo Company (SM nylon, temperature conductivity=2.45×10⁻⁴ m²/hr) to a subsidiary injector. More specifically, the primary injection was carried out under a pressure of about 60 kg/cm² for 1.3 seconds from the main injector, and the injection of PET was stopped for 0.1 second. After passage of 1.4 seconds from the point of initiation of the injection of PET, a predetermined amount of molten SM nylon was injected for 0.8 second under a pressure (about 100 kg/cm²) higher than the primary injection pressure from the subsidiary injector. After passage of 0.05 second from the point of termination of the injection of SM nylon, PET was injected under a pressure (about 30 kg/cm²) lower than the primary injection pressure from the main injector. Thus, a multi-layer preform having a thickness of about 5 mm was formed. The weight of the preform was about 59 g and the weight ratio of SM nylon was about 4.5%.

Under the same conditions as described in Example 3, the multi-layer preform was biaxially draw-blown and simultaneously, heat-set and cooled in one mold to obtain a bottle having an inner volume of 1500 cc, which had the same shape as that of the bottle obtained in Example 3.

(Oxygen gas permeability)

The oxygen gas permeability $QO_2$ of the obtained bottle of the present invention was 0.9 cc/m$^2$·day·atm (the storage conditions were the same as described above).

The oxygen gas permeability $QO_2$ of a single-layer PET bottle (having the same shape and inner volume as described above) formed for comparison was 4.4 cm/m$^2$·day·atm.

(Heat resistance)

The heat resistance test (the measurement of the distortion ratio S of the bottle) of the obtained bottle of the present invention having an inner volume of 1500 cc was carried out in the same manners described above. The distortion ratio S of the bottle was −0.1%. No change of the shape was observed.

We claim:

1. A biaxially drawn polyester vessel having good resistance to heat distortion and gas-barrier properties, which is prepared by biaxially draw-blow forming of a preform comprising inner and outer layers of a polyester composed mainly of ethylene terephthalate units and at least one intermediate layer composed of a gas-barrier resin with the temperature conductivity of the gas-barrier resin being ½ to ¼ the temperature conductivity of the polyester, wherein the barrel of the vessel has pillar convexities having a relatively large diameter and a short circumference and panel-like concavities having a relatively small diameter and a long circumference, which are alternately arranged in the circumferential direction of the barrel where the circumferential size of the panel-like concavities is 10 to 50 mm, the axial size of the panel-like concavities is 40 to 160 mm and the step between the panel-like concavities and the pillar convexities is 1 to 8 mm, the panel-like concavities having a function of expanding and contracting in the diameter direction of the barrel according to the change of the pressure in the vessel, the inner and outer layers in the panel portion are biaxially and molecularly oriented so that the in-plane orientation degree $(l+m)$ is at least 0.350, and the inner and outer layers in the panel portion are heat-set so that the crystallization degree, determined by the density method, of the outer layer in the panel portion is at least 30% and is higher by at least 2% than the crystallization degree of the inner layer in the panel portion.

2. The biaxially drawn polyester vessel according to claim 1, wherein said polyester is polyethylene terephthalate or a copolyester comprising ethylene terephthalate units as main units and a small amount of units copolymerizable with said ethylene terephthalate units.

3. The biaxially drawn polyester vessel according to claim 1, wherein the biaxially draw-blow forming is at a temperature of 120° to 230° C.

4. The biaxially drawn polyester vessel according to claim 1, wherein the crystallization degree of the outer layer is higher by at least 3% than the crystallization degree of the inner layer in the panel portion.

* * * * *